United States Patent [19]

Porter

[11] Patent Number: 5,678,785
[45] Date of Patent: Oct. 21, 1997

[54] FIBER-OPTIC CABLE DISPENSER AND REMOTELY CONTROLLED VEHICLE USING SAME

[75] Inventor: David R. Porter, Huntsville, Ala.

[73] Assignee: SCI Industries, Inc., Huntsville, Ala.

[21] Appl. No.: 690,218

[22] Filed: Jul. 26, 1996

Related U.S. Application Data

[63] Continuation of Ser. No. 358,341, Dec. 16, 1994, abandoned.

[51] Int. Cl.[6] .............................. F42B 15/04; B65H 55/00
[52] U.S. Cl. ..................... 244/3.12; 114/21.2; 102/504; 242/171; 242/172
[58] Field of Search .................................. 114/21.2, 21.1, 114/254; 244/3.12, 3.16; 102/504; 385/134, 147, 123; 242/170, 171, 172, 128

[56] References Cited

U.S. PATENT DOCUMENTS

| | | | |
|---|---|---|---|
| 3,089,588 | 5/1963 | Correll | 242/170 |
| 3,319,781 | 5/1967 | Simpson et al. | 242/170 |
| 3,378,215 | 4/1968 | Wilson | 242/171 |
| 3,613,619 | 10/1971 | de Nobel et al. | 114/21.1 |
| 3,615,427 | 10/1971 | Bishop et al. | 242/172 |
| 3,703,874 | 11/1972 | Lemieux | 114/21.1 |
| 4,412,662 | 11/1983 | Rutecki . | |
| 4,746,080 | 5/1988 | Pinson | 242/177 |
| 4,770,370 | 9/1988 | Pinson | 244/3.12 |
| 4,903,607 | 2/1990 | Clark | 244/3.12 |
| 4,967,980 | 11/1990 | Pinson | 244/3.12 |
| 4,974,793 | 12/1990 | Pinson | 244/3.12 |
| 5,029,772 | 7/1991 | Redford | 244/3.12 |
| 5,029,959 | 7/1991 | Stubbs . | |
| 5,044,573 | 9/1991 | Le Compte | 244/3.12 |
| 5,056,406 | 10/1991 | Pinson | 244/3.12 |
| 5,058,969 | 10/1991 | Peterson et al. . | |
| 5,143,319 | 9/1992 | LeCompte | 244/3.12 |
| 5,161,208 | 11/1992 | Christie et al. . | |
| 5,179,612 | 1/1993 | Rochester et al. . | |
| 5,181,270 | 1/1993 | Hsu et al. . | |
| 5,189,253 | 2/1993 | LeCompte . | |
| 5,402,966 | 4/1995 | von Hoessle | 244/3.12 |

OTHER PUBLICATIONS

*Tether Dynamics Simulator* by David R. Porter and Dr. Nels H. Madsen, published by SCI Systems, Inc., Huntsville, Alabama.

"The Motion and Tension of an Unwinding Thread. I" by Daphne G. Padfield, Proceedings of the Royal Society A, vol. 245, pp. 382–384 and 391–345, 1958.

*Primary Examiner*—Michael J. Carone
*Assistant Examiner*—Theresa M. Wesson
*Attorney, Agent, or Firm*—Curtis, Morris & Safford, P.C.; Gregor N. Neff

[57] ABSTRACT

Fiber-optic cable is wound on a cylindrical bobbin without adhesive and is situated in the vehicle so that the cable, attached to a relatively stationary control computer station, is pulled freely off of the bobbin as the vehicle, such as a missile or torpedo, travels rapidly away from the station. In one embodiment, a propulsion engine is located within the hollow interior of the bobbin and the cable flows outwardly in a helix around the plume of the engine.

14 Claims, 5 Drawing Sheets

FIBER-OPTIC CABLE DISPENSER AND REMOTELY CONTROLLED VEHICLE USING SAME

This application is a continuation of application Ser. No. 08/358,341, filed Dec. 16, 1994 now abandoned.

This invention relates to fiber-optic cable dispensers for use in remotely controlling vehicles, such as airborne missiles, underwater vehicles, land vehicles, etc.

The remote control of missiles and other vehicles by signals sent over elongated cables connected to the vehicles has many advantages. Typically, the vehicle contains a camera or other device which detects various aspects of the terrain over which the vehicle is flying or objects in the vehicle's path and transmits these signals back through the cable to the control station computer. The control station computer then adjusts the course of the vehicle accordingly.

One of the advantages is that video, sonar and/or telemetry signals can be transmitted through the cable from the vehicle, while signals can be transmitted simultaneously to the vehicle for guidance. More powerful computers can be used at the control station for controlling the vehicles than would be practical if the computers were on board due to size, power, and/or cost constraints. In expendable vehicles, on-board equipment is destroyed during its use and cannot be used to control other vehicles later. Also, ground operators may operate the controls to provide greater flexibility in controlling the vehicle.

Both electrical wire and fiber-optic cable have been used. However, fiber-optic cable is generally considered to be superior in that it is relatively small, lightweight, has a high tensile strength, exhibits very low signal attenuation, has a very high bandwidth, does not require shielding, does not radiate, virtually cannot be jammed, and is available in long lengths. A single fiber-optic cable may be used to communicate in both directions by wavelength-division-multiplexing with two carrier frequencies of light.

There are several constraints with dispensing fiber-optic cable in guided missiles. A relatively long cable often must be stored in a mechanically stable configuration for an extended period of time prior to use. Thereafter, the fiber must be dispensed at high velocities without breaking.

In typical prior art fiber-optic cable dispensers, the cable is wound on slightly tapered bobbins to reduce friction and otherwise facilitate dispensing. An adhesive is coated on the cable to cause adhesion, to a moderate degree, of the cable coils to the remainder of the wound-cable to prevent the cable from being prematurely dispensed and to minimize the chances of snarling.

The formulation of the adhesive is extremely demanding, in that the adhesive should be weak enough to separate at the "peel-point", i.e., the point at which the cable peels off of the roll, and yet it should be strong enough to prevent entire turns from coming off of the pack which can cause the cable to become tangled and break.

The adhesive formulation is so problematic that the need to eliminate it has been recognized for some time. To this end, several different approaches have been proposed. For example, see those proposed in U.S. Pat. Nos. 5,058,969; 5,179,612 and 5,189,253.

Applicant has recognized that such prior approaches are not entirely effective in that they attempt to suppress the helical form of the cable as it is dispensed. In so doing, it is believed that the flow of the cable is impeded after it leaves the bobbin, and will likely cause "ballooning" of the fiber off of the bobbin. This ballooning, it is believed, will cause instability in the flow of the cable off of the bobbin, leading to possible snarling and breakage.

In underwater vehicles, such as unmanned robotic vehicles or underwater missiles, the usual prior art arrangement is to use a dispenser buried deep inside the vehicle which dispenses fiber-optic cable from the inside of a toroidal cable pack, rather than from the outside of a bobbin. The cable then passes through a conduit in the vehicle and out into the water behind the vehicle. The cable usually is pre-twisted so that when it is dispensed it will lay straight, without twists. This is done to avoid loops and tangles which easily could lead to broken cables.

Adhesive is also used for such underwater dispensers. However, the adhesive in underwater use has further problems. The adhesive should not adversely impact the environment and should not attract sea life that might cause damage to the tether. Underwater adhesives often are relatively tacky. This can result in substantial friction between the cable and the conduit in the vehicle, thus producing relatively high cable tension. This, in turn, sets the limit on how thin the cable can be. Thinner cable is desirable in that it can provide both performance and cost advantages, and the use of adhesives tends to thwart the attempt to use cable of a smaller diameter.

In accordance with the foregoing, it is an object of the present invention to provide a fiber-optic cable dispensing device and method which alleviates or eliminates the foregoing problems.

In particular, it is an object of the invention to provide a fiber-optic cable dispensing device and method in which the need for adhesives is eliminated.

A further object is to provide such a device and method in which cable of a relatively small diameter can be used.

It is also an object of the invention to provide such a device and a manufacturing method in which the bobbins are substantially easier and lower in cost to make.

Another problem with such prior dispensers is that they often cause the cable to bend through a substantial angle as it is being dispensed. For this reason, relatively expensive bend-resistant cable must be used instead of lower cost communications cable which already is used by the telecommunications industry.

In accordance with the foregoing, it is another object of the invention to provide a fiber-optic cable dispenser and method in which relatively high cost cable need not be used, and in which relatively inexpensive communications cable can be used instead.

In accordance with the present invention, the foregoing objects are met by the provision of a dispenser device and method in which fiber-optic cable is wound on a cylindrical bobbin without adhesive. The bobbin has an outwardly extending guide member near its aft end over which the cable is pulled. The surface of the guide member is very smooth.

The cover for the dispenser is positioned so that it allows the cable to come off of the roll freely in a natural helix trailing behind the vehicle. The formation of the helix is substantially unimpeded by the structure of the dispenser or the vehicle. By this means, the natural progression of the peel point and the take off point and the point of contact between the cable and the guide are maintained in a relatively stable relationship to one another so that loops of excess cable do not readily come off of the roll and tangles or snarls are not likely to be created.

For underwater use, the dispenser device can be positioned at the aft end of the vehicle, and the propulsion means for the vehicle can be positioned so as to deliver thrust through the hollow center of the bobbin. This considerably simplifies the construction of the vehicle. Preferably, a brake is provided to impede the unwinding of cable when the vehicle is standing still in water and to provide some tension in the cable when the vehicle is moving at relatively slow speeds.

Because the bending of the cable is limited by the radius of the guiding surface and can be chosen to be considerably less than it would be if a conventional dispenser were used, relatively low cost cable can be used, with the result that a substantial cost saving is realized.

In one form of the invention, the guide is a simple circular flange at the aft end of the bobbin. Another flange is at the forward end of the bobbin, and the cable is wound in layers extending from one flange to the other.

In an alternative embodiment, where the stack of cable wound on the bobbin has a trapezoidal shape in cross-section; that is, where each successive layer has a length in the longitudinal direction of the bobbin which is shorter than the previous layer, the circular guide member is located forwardly of the aft end of the bobbin at a location coincident with or forwardly of the aft end of the outermost layer of the pack. By this means, the tendency to dispense multiple turns forming loops and the tendency towards breakage of the cable is minimized.

In one embodiment of a vehicle using the dispenser of the invention, the dispenser is in the aft end of an airborne missile, with a propulsion engine mounted inside and projecting a plume out of the center of the bobbin. This not only saves space, but it simplifies the missile's construction.

This construction is particularly advantageous in the case of pulse propulsion engines which operate for a fraction of a second only in propelling missiles towards an object, such as in seeking and destroying other on-coming missiles. The broad helix formed behind the vehicle tends to keep the cable from being destroyed or damaged by the hot gases from the propulsion engine, especially when those gases exist only for a very short time.

The foregoing and other objects and advantages of the invention will be set forth in or be made apparent by the following description and drawings.

VEHICLES

Figure 1:
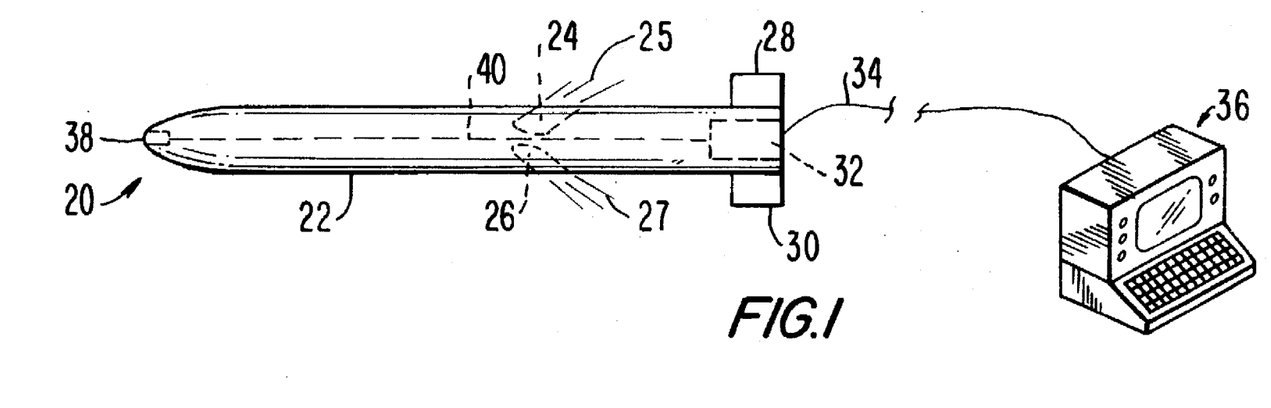
FIG. 1 is a perspective schematic view of a missile and control system utilizing the present invention.

FIG. 1 shows a typical airborne missile 20 utilizing a fiber-optic cable dispenser in accordance with the present invention. The missile includes a housing 22, propulsion engines 24 and 26 which send plumes of hot gases 25 and 27 outwardly from the housing at a location forward of the aft end of the missile, where their hot gases will not damage the cable. Guidance fins 28 and 30, together with internal guidance mechanisms (not shown), guide the missile in accordance with signals received through a cable 34 dispensed from a dispenser 32 and trailing behind the vehicle. The cable is connected to a ground station computer 36.

A camera or other detector 38 detects objects and terrain ahead of the missile, and sends corresponding signals through the cable 40 and back through the cable 34 to the station 36.

The missile can be either automatically controlled by the computer 36, or by a human operator who can view the terrain, etc., ahead of the missile and control its flight.

Figure 2:
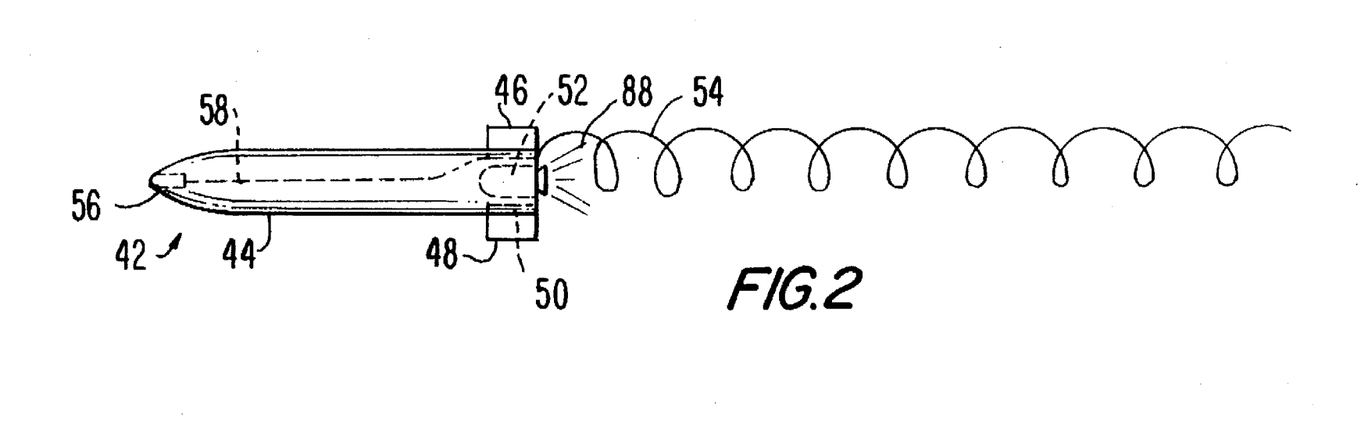
FIG. 2 is a perspective and schematic view of another missile utilizing the present invention.

FIG. 2 shows a second airborne missile 42 which utilizes a dispenser in accordance with the present invention. The missile 42 includes a housing 44, control fins 46 and 48, a cable dispenser 50 at the aft end, and a propulsion engine 52 mounted in the hollow interior of the cable dispenser.

The missile also contains a detector 56 which sends picture signals through the cable 58 and through the cable 54 to the control station.

As it can be seen, the cable 54 emerging from the aft end of the missile forms a relatively large helix which gradually decreases in diameter at increasing distances behind the missile. The stream 88 of hot gases emerging from the propulsion engine are not believed to be harmful to the cable 54 emerging from the missile because the helix billows out from the dispenser, and because engine 52 is designed to operate only for a very short time.

Figure 3:
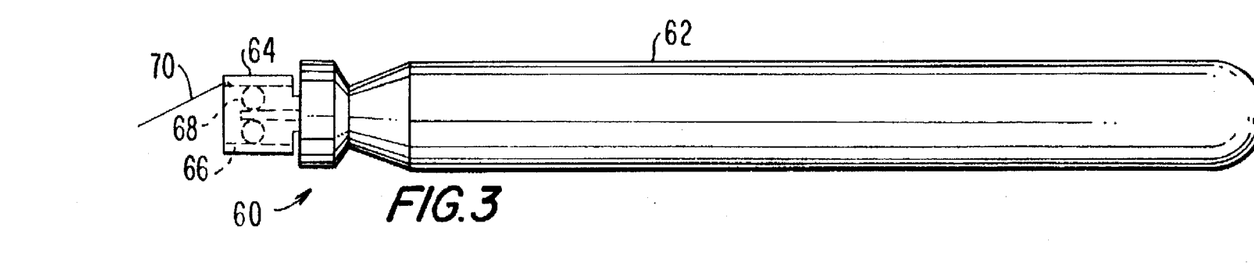
FIG. 3 is a side elevation and partially schematic view showing an underwater vehicle, such as a torpedo, utilizing the present invention.

FIG. 3 shows an underwater vehicle such as a torpedo 60 with a housing 62 and a shroud 64 at the aft end within which is located a propeller 68. The propeller is driven by a propulsion engine (not shown) to propel the torpedo through the water. A dispenser 66 of fiber-optic cable 70 surrounds the propeller and dispenses cable 70 from the aft end of the vehicle.

DISPENSERS

Figure 4:
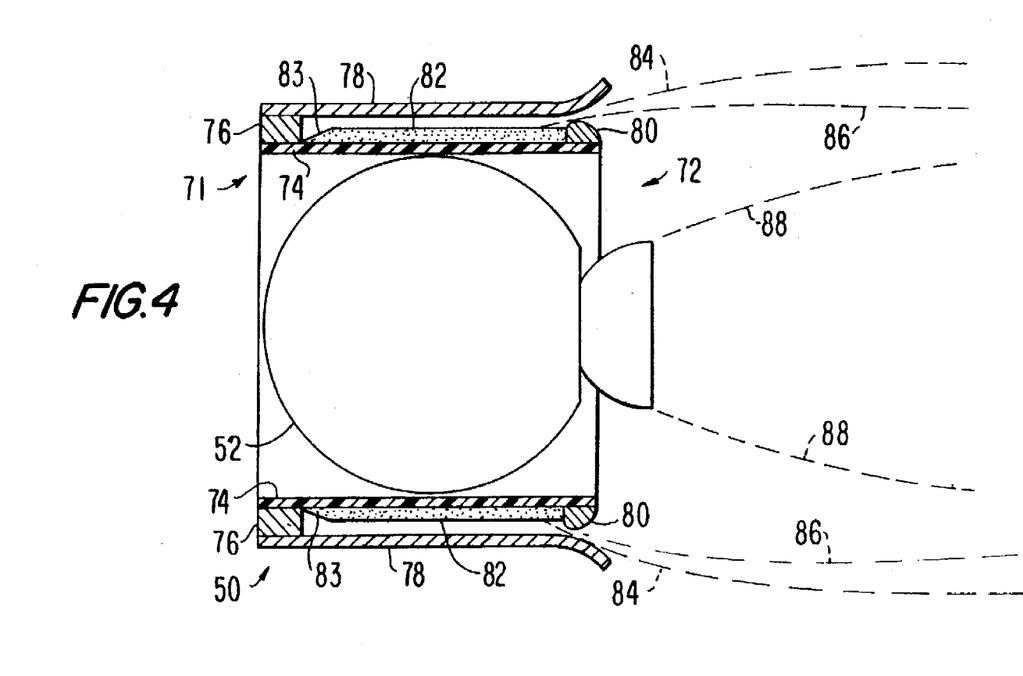
FIG. 4 is a cross-sectional view of the dispensing device and propulsion engine of the missile shown in FIG. 2.

Now referring to FIG. 4, the fiber-optic cable dispenser 50, shown in FIG. 2, is shown enlarged and in cross-section. The dispenser consist of a bobbin 74 which has the form of a cylinder made out of fiber-wound material. A ring 76 is mounted at the forward end 71 of the dispenser and is used to mount the dispenser in the missile 42. An outside cover 78 is secured to the ring 76 and protects the wound cable from the rushing air and environment.

A roll or "pack" 82 of fiber-optic cable is wound in a form on the bobbin 74 which is trapezoidal in cross-section. A circular guide member in the form of a rounded flange 80 is secured to the bobbin at its aft end 72. The guide member 80 has a smooth rounded outer edge and a sloping trailing edge.

The aft edge of the cover 78 is located near the guide 80 to leave an opening between the two members to allow the cable to flow freely between those parts.

The forward surface of the guide 80 is flat and extends straight radially outwardly from the surface of the bobbin. The aft edge of the roll 82 of cable is straight and flat, since the cable is wound flush against the forward surface of the guide 80.

The forward edge 83 of the cable roll slopes. This makes the winding of the roll easier than if the cable were wound flush against both the aft edge of the ring 76 and the forward edge of the guide flange 80.

As the cable is dispensed from the aft end of the vehicle, it forms a helix, as shown in FIG. 2. The outside edges of the helix might describe the path indicated by the dashed lines 86 of FIG. 4, when the engine 52 is not operating. However, when the engine 52 turns on briefly, the pressure wave from the engine is believed to cause the cable to take the path shown by the dashed lines 84. Thus, the freely flowing cable is largely unimpeded and undamaged by the rocket engine plume, shown at 88.

This construction is particularly advantageous for relatively short-range missiles such as those used to seek and destroy on-coming missiles.

Figures 5, 6:
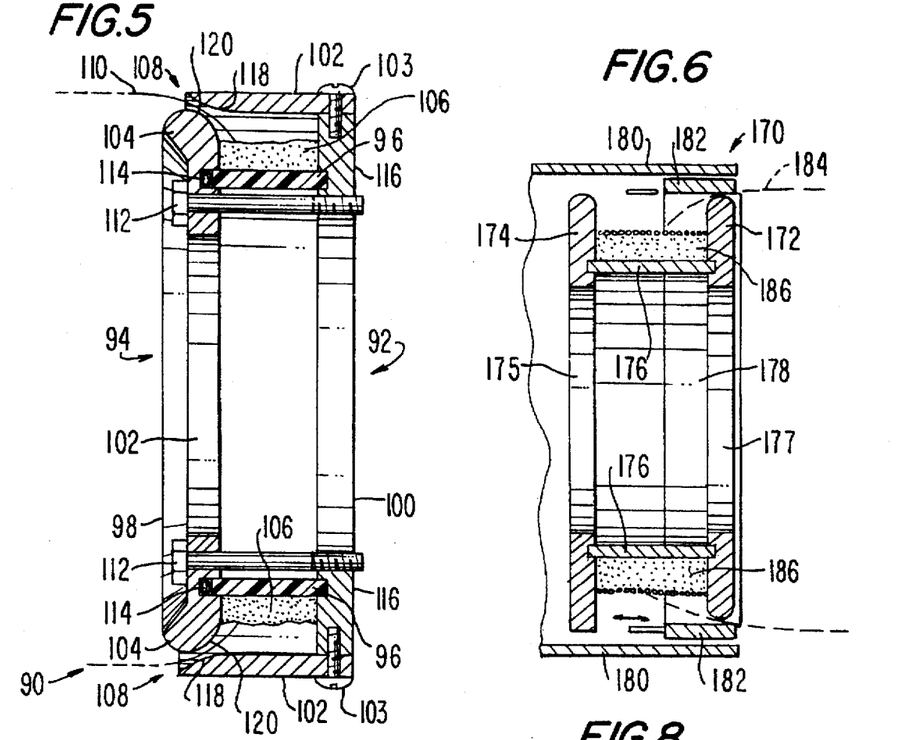
FIG. 5 is a cross-sectional view of a preferred fiber-optic cable dispenser which has been successfully built and tested.
FIG. 6 is a cross-sectional view of another dispenser used particularly in underwater vehicles.

FIG. 5 shows a dispenser which actually has been built and successfully tested. The winding 106 or pack of cable is rectangular in cross-section, rather than trapezoidal. The winding is formed between two flanges, one at the aft end 94, and another at the forward end 92 of the dispenser 90. A cylindrical bobbin or mandrel 96 is fitted into circular grooves in an aft flange 98 and a forward flange 100. The forward flange 100 is utilized to mount the dispenser 90 onto the vehicle.

A plurality of threaded fasteners 112 extend through holes in the aft flange 98 into threaded holes in the forward flange 92 to clamp the flanges together. A flexible O-ring 114 is mounted in the circular groove in the aft flange 98. The distance between the flanges can be adjusted by turning the threaded fasteners or bolts 112 and either compressing the O-ring 114 or relieving compression on that O-ring to vary the distances between the flanges, for purposes to be described below.

The outer edge of the aft flange 104 is curved and has a very smooth polished surface at the edge 120 over which cable 110 from the pack 106 is dispensed.

A cover 102, also generally cylindrical in shape, is secured to the forward flange 100 by means of screws 103. The aft edge of the cover 102 is highly polished and is curved at 118 to form a smooth, relatively unrestricted passage 108 through which the cable 110 can pass freely, without any substantial impedance.

The dispenser 90 shown in FIG. 5 is relatively short because it is designed to store only relatively small amounts of cable for short-range missiles. For longer range missiles, the length of the dispenser 90 would be increased substantially.

The height of the flange 104 should be such that the pack 106 of cable wound on the bobbin will be held in place. The upstanding edge 104 of the aft flange serves as a guide to guide the dispensing of cable from the dispenser.

Figure 9:
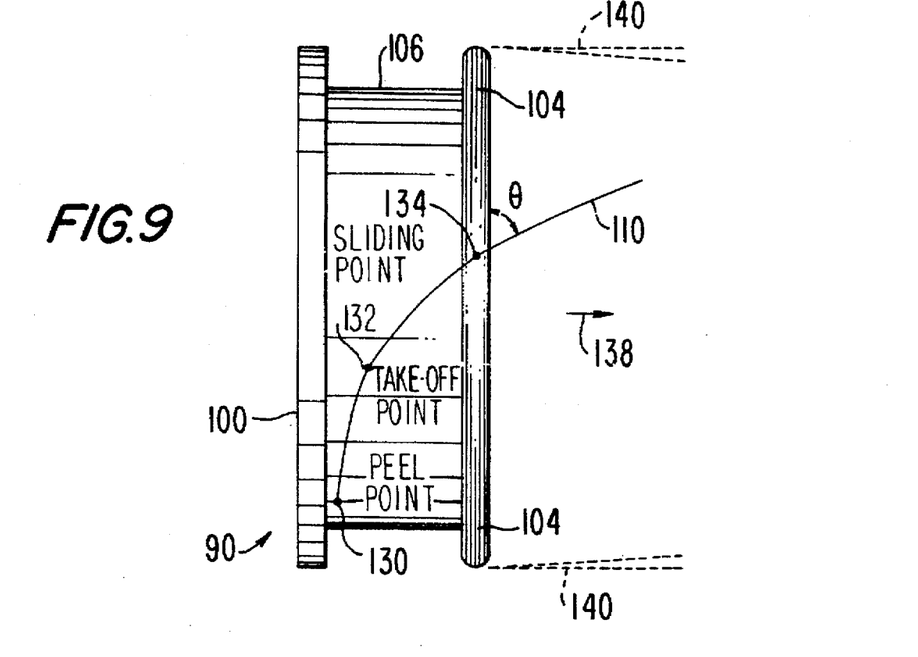
FIGS. 9 and 10 are schematic views of a dispenser like that shown in FIG. 5 used to explain the dynamics of the dispensing of the cable.
Figure 10:
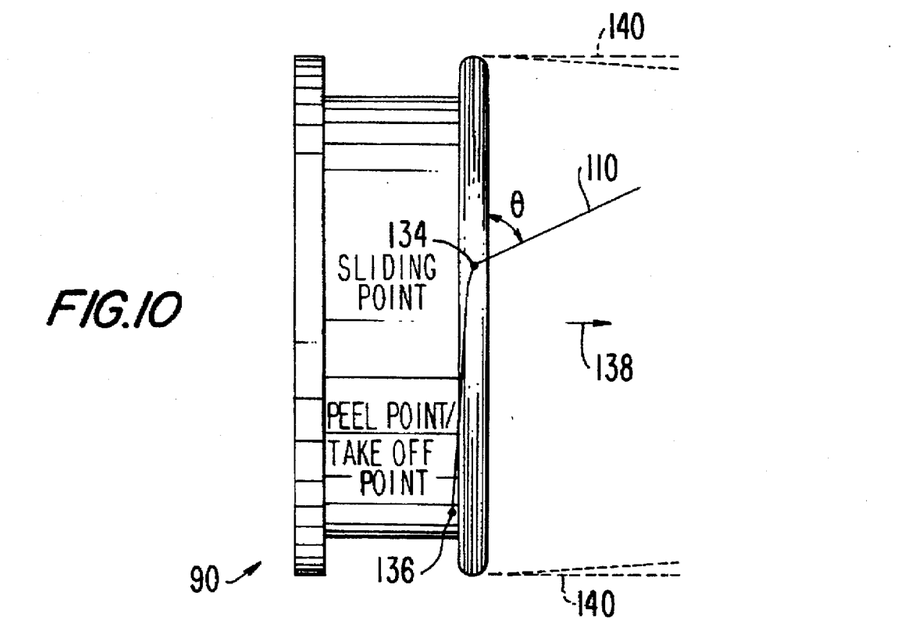

The dispensing of cable 110 from the dispenser 90 is illustrated schematically in FIGS. 9 and 10.

Referring now to FIGS. 9 and 10, in the normal flow of cable 110 over the guide 104, the cable first starts to separate from the pack at a point 130 known as the "peel-point".

The cable then starts to lift off of the pack at a point 132 called the "take-off point".

The cable makes contact with the guide 104 at a point 134 known as the "sliding point".

Applicant has recognized that it is undesirable to have the peel-point or the take-off point move either more rapidly or less rapidly around the circumference of the pack than the sliding point. To this end, it is desired to keep the impedance of the flow of the cable as low as possible. Thus, the surface 104 is highly polished electroless nickel plated aluminum, and there is very little friction or resistance to the flow of cable from the pack and into the air or space through which the missile is traveling.

Applicant has recognized and believes that, by attempting to collapse the helix in which the cable naturally is dispensed behind the vehicle, perturbations are created in the flow of the cable. This creates transient instability and enhances the chance of breakage. Therefore, obstructions in the path of the helix are eliminated to the maximum extent possible.

FIG. 10 shows how the peel-point and the take-off point migrate and are located when the peel-point is near the aft end of the dispenser.

The key to maintaining stable flow of the cable is believed to be maintaining the angle $\Theta$, called the "take-off" angle, as near to the natural angle as possible. It has been discovered that this angle is somewhere around 60° (30° with the longitudinal axis of the dispenser). This angle is maintained at or near its natural value by eliminating or minimizing the drag created by contact with the guide 104 at the sliding point 134, and by eliminating or minimizing impedances thereafter.

The bobbin preferably consists of a matrix of glass or carbon fiber in epoxy resin. The materials are selected so that the coefficient of thermal expansion in both the radial and axial dimensions of the bobbin match those of the fiber-optic cable wound on it. This avoids distortion of the pack.

Figure 11:
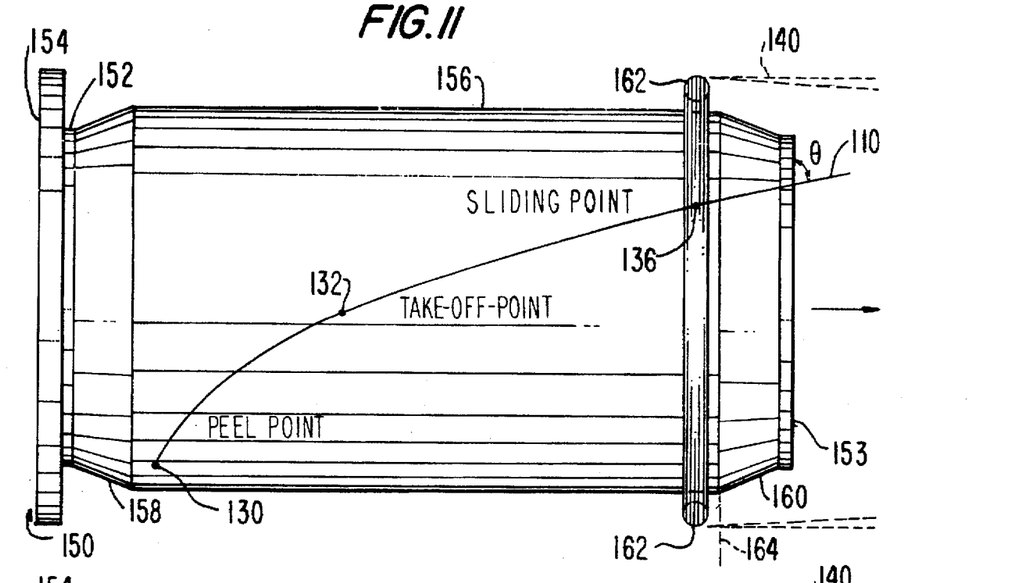
FIGS. 11 and 12 are schematic views of another dispenser of the invention utilizing windings which are progressively shorter at greater distances of the layer from the longitudinal axis of the bobbin.
Figure 12:
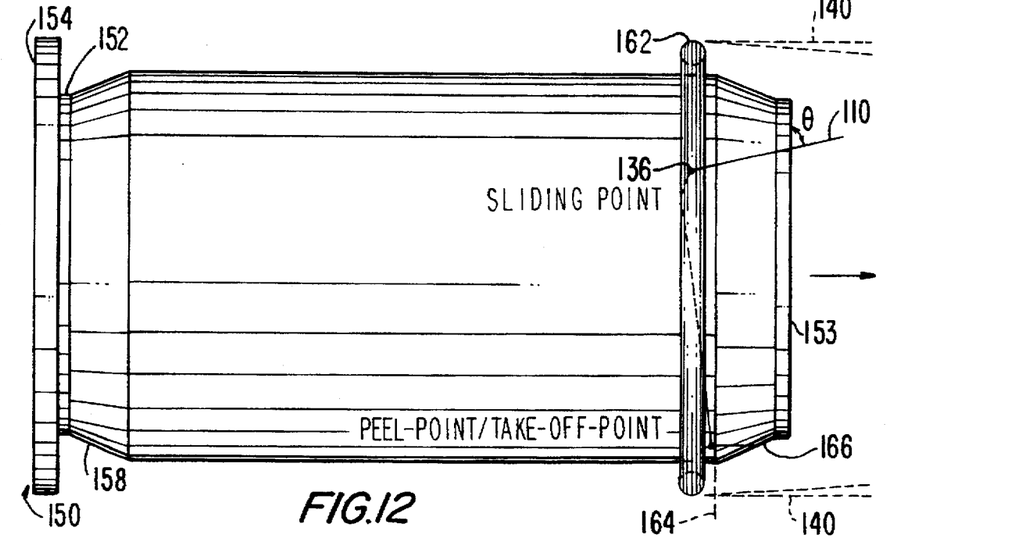

FIGS. 11 and 12 demonstrate the mechanics of dispensing fiber-optic cable 110 from a trapezoidal pack of wound fiber such as that shown in FIG. 4. A forward end flange 154 is provided to which the bobbin 152 is secured, and which is used to mount the dispenser to the vehicle. The pack 156 is wound on the bobbin with sloping forward and aft edges 158 and 160, respectively. The aft end of the bobbin is at 153.

The guide ring 162 is attached to the aft end of the bobbin by support means which is not shown. This guide ring provides for smooth dispensing of the cable. The peel-point 130, the take-off point 132, and the sliding-point 136 are shown in both FIGS. 11 and 12.

Advantageously, in accordance with one of the features of the invention, the guide 162 is located either even with or forwardly of the aft edge 164 of the top layer of the pack. This minimizes the chances that loops will form and helps assure smooth dispensing. This insures that the take-off angle $\theta$ will remain at or near the natural value.

FIG. 6 shows a dispenser 170 which is particularly suitable for use in underwater vehicles. The dispenser 170 includes a bobbin 176, an aft flange 172 and a forward flange 174 secured together by fasteners (not shown) which can be similar to those shown in FIG. 5.

The wound pack of cable 186 is rectangular in cross-section.

A housing member 180 extends around the periphery of the dispenser. The flanges have central openings 175 and 178 which can accommodate a propeller or other propulsion means as is illustrated in FIG. 3.

A braking member 182 is provided for providing increased friction on the cable to maintain its tension at a sufficiently high level when the vehicle is not moving or is moving very, very slowly to maintain tension on the cable that is being dispensed.

Since the speed of vehicles underwater is very much less than that of airborne missiles, the problem of the cable coming off of the spool when the vehicle is traveling very slowly or is at standstill is more significant so that braking is provided. Still, by dispensing the cable 184 successfully from the outside instead of the inside of the pack, the construction of the vehicle can be simplified by eliminating internal conduit and positioning the dispenser at the aft end of the vehicle.

CABLE WINDING

In the implementation of the form of the invention in which the pack is rectangular in shape, and each layer is wound and extends between opposite flanges, such as in FIG. 5, a winding technique is used which is highly advantageous.

The normal technique used for winding such bobbins includes the formation on the outer surface of the bobbin of a plurality of grooves into which the fiber is laid so as to accurately start the winding process.

Figure 8:
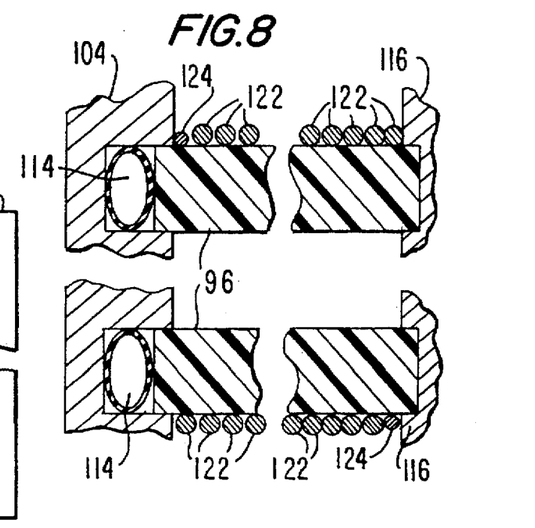
FIG. 8 gives fragmentary views of structures used in forming the surface of the bobbins for receiving fiber-optic cable during winding.

This is done, in accordance with conventional techniques, by painting an epoxy resin coating on the outside of the bobbin, allowing it to partially cure, and, while it is still soft, winding a wire such as the wire 122 shown in FIG. 8 onto the bobbin surface, thus forming semicircular impressions or grooves in the soft epoxy. Then, the wire is removed and the epoxy coating is cured in an oven or otherwise so that hard grooves have been formed into which the cable can be laid to accurately start the winding.

In accordance with further features of the present invention, improvements have been made. The diameter of the wire normally is one to two percent in excess of the diameter of the cable to be wound. In a typical dispenser, constructed in accordance with the present invention, the fiber-optic cable might be 10 mils in diameter. This diameter is only somewhat larger than the diameter of a typical human hair.

One of the problems with winding the wire on the mandrel is that it is usually difficult to pack the wire strands 122 closely enough together. In accordance with the present invention, the packing of the wires together is improved by turning the bolts 112 to tighten the wire pack together until they are abutting firmly against one another, thus forming a better groove structure for winding.

Figure 7:
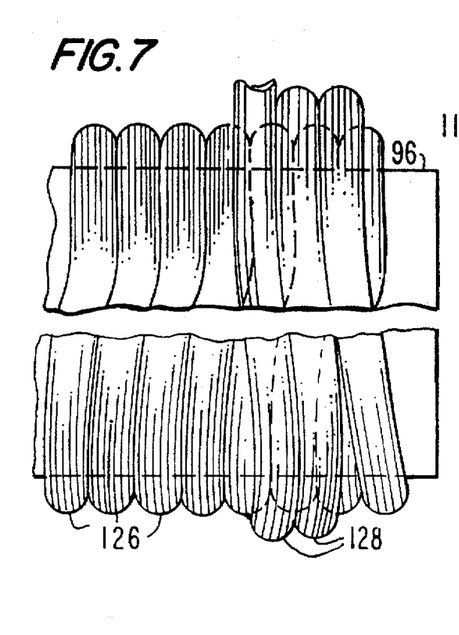
FIG. 7 is an enlarged schematic view of cable windings on a bobbin to show the way in which the cable is wound.

A winding technique which has been found to be particularly valuable for winding all packs disclosed herein is one such as is illustrated schematically in FIG. 7. In FIG. 7, a bobbin 96 is shown. The first layer of cable is shown at 126. When the winding transfers to the second layer, the upper windings moves over ½ of the cable diameter to fit in the grooves of the layer immediately beneath. This arrangement is called a "balanced winding" in that it exists in every layer of the winding. In contrast, in the prior art windings, offsets are only prominent in even layers, counting from the bottom layer, so that the winding stresses are not as evenly distributed as in the structure shown in FIG. 7.

Further in accordance with the present invention, the grooves necessary for forming such windings are facilitated by supplying a short length of wire 124 of slightly larger than ½ the diameter of the wire 122 (see FIG. 8) equal in length to ½ the circumference of the bobbin. Two such pieces of wire are located as shown over selected portions of the circumference of the bobbin so as to give the proper spacing of the coils in the first layer of the winding.

As it can be seen from the foregoing, the present invention meets the objectives set forth above. In particular, the use of adhesives has been eliminated. In addition, the use of a tapered bobbin also has been eliminated, thus facilitating manufacture of the bobbins and reducing their cost.

Cable is dispensed from the dispenser smoothly and freely and with substantially reduced tendencies to form loops and break. The construction of both airborne and underwater missiles using the invention has been substantially simplified.

The above description of the invention is intended to be illustrative and not limiting. Various changes or modifications in the embodiments described may occur to those skilled in the art. These can be made without departing from the spirit or scope of the invention.

I claim:

1. A fiber-optic cable dispenser for remotely guided vehicles, said dispenser comprising, in combination,
   a cylindrical support member;
   a quantity of fiber-optic cable wound on said support member in multiple layers;
   said dispenser having a forward end and an aft end;
   a smooth circular guide member at said aft end, said guide member being located radially outwardly from said support member and extending to a location beyond the outermost layer of said fiber-optic cable when said cable is fully wound on said support member;
   mounting means at said forward end for mounting said dispenser onto said vehicles; and
   a cover encircling said support member and having a rear edge adjacent said guide member, said cover being spaced from said guide member to provide substantially unimpeded movement of said cable rearwardly from said support member past said guide member.

2. A dispenser as in claim 1 in which said layers have progressively shorter lengths in the direction of the longitudinal axis of said support member as the distance of the layer from said axis increases, said guide member being located at a position spaced forwardly from said aft end by a distance equal to or greater than the distance of the outermost one of said layers from said aft end.

3. A dispenser as in claim 1 in which said guide member is a flange, each of said layers extending up to at least said guide member.

4. A dispenser as in claim 1 in which said cable is substantially free of adhesive.

5. A fiber-optic cable dispenser for remotely guided vehicles, said dispenser comprising, in combination,
   a cylindrical bobbin;
   a quantity of fiber-optic cable wound on said bobbin in multiple layers;
   said bobbin having a forward end and an aft end;
   a smooth circular guide member at said aft end, said guide member being located radially outwardly from said bobbin and extending to a location beyond the outermost layer of said fiber-optic cable;
   mounting means at said forward end for mounting said bobbin onto said vehicles; and
   a cover encircling said bobbin and having a rear edge adjacent said guide member, said cover being spaced from said guide member to provide substantially unimpeded movement of said cable rearwardly from said bobbin past said guide member, in which said guide member is a flange, each of said layers extending up to at least said guide member, and including a second flange at said forward end of said bobbin, and adjusting means for adjusting the distance between said flanges.

6. A remotely guided underwater vehicle comprising a housing, an underwater propulsion engine mounted in said housing, a fiber-optic cable dispenser, in said housing, said dispenser comprising, in combination,
   a cylindrical bobbin;
   a quantity of fiber-optic cable wound on said bobbin in multiple layers;
   said bobbin having a forward end and an aft end;
   a smooth circular guide member at said aft end, said guide member being located radially outwardly from said bobbin and extending to a location beyond the outermost layer of said fiber-optic cable;

mounting means at said forward end for mounting said bobbin onto said housing; and a cover encircling said bobbin and having a rear edge adjacent said guide member, said cover being spaced from said guide member to provide substantially unimpeded movement of said cable rearwardly from said bobbin past said guide member, said dispenser including brake means for selectively braking the flow of said cable from said bobbin.

7. A fiber-optic cable dispenser for remotely guided vehicles, said dispenser comprising, in combination, a cylindrical bobbin;

a quantity of fiber-optic cable wound on said bobbin in multiple layers;

said bobbin having a forward end and an aft end;

a smooth circular guide member at said aft end, said guide member being located radially outwardly from said bobbin add extending to a location beyond the outermost layer of said fiber-optic cable;

mounting means at said forward end for mounting said bobbin onto said vehicles; and a cover encircling said bobbin and having a rear edge adjacent said guide member, said cover being spaced from said guide member to provide substantially unimpeded movement of said cable rearwardly from said bobbin past said guide member, in which said guide member is a flange, said bobbin also having a flange at said forward end, each of said layers extending up to said guide member.

8. A remotely guided vehicle for traveling through a fluid medium, said vehicle comprising a housing having a forward end and an aft end, a propulsion engine mounted to said housing, a detector in said housing for detecting and creating signals representing objects adjacent to the path of travel of said vehicle, and a fiber-optic cable storage and dispensing unit mounted to said housing, said storage and dispensing unit including a cylindrical support member, a mounting structure for mounting said support member to said housing, said support member having forward and aft ends, a raised dispensing guide ring secured at said aft end of said support member, a quantity of fiber-optic cable wound on said cylindrical support member to a position located radially inwardly of said guide ring and connected to said detector at one end and to guidance control equipment at the opposite end, and a shroud around said cable storage and dispensing unit and spaced from said ring so as to allow said cable to be pulled off of said cylindrical support member over said ring and expand freely in said fluid medium behind said vehicle.

9. A vehicle as in claim 8 in which both said propulsion engine and said storage and dispensing unit are mounted at the aft end of said housing, with said support member being hollow and said propulsion engine being mounted inside of said support member.

10. A vehicle as in claim 8 in which said vehicle is adapted to propel itself through water, said support member being hollow and said storage and dispensing unit being positioned at said aft end of said housing, said propulsion engine being positioned to create a driving thrust through the hollow center of said support member.

11. A vehicle as in claim 8 in which said cable is substantially adhesive-free.

12. A remotely guided vehicle for traveling through a fluid medium, said vehicle comprising a housing having a forward end and an aft end, a propulsion engine mounted to said housing, a detector in said housing for detecting and creating signals representing objects adjacent to the path of travel of said vehicle, and a fiber-optic cable storage and dispensing unit mounted to said housing, said storage and dispensing unit including a cylindrical bobbin, a mounting structure for mounting said bobbins to said housing, said bobbin having forward and aft ends, a raised dispensing guide ring secured at said aft end of said bobbin, a quantity of fiber-optic cable wound on said bobbin to a position located radially inwardly of said guide ring and connected to said detector at one end and to guidance control equipment at the opposite end, and a shroud around said bobbin and spaced from said ring so as to allow said cable to be pulled off of said bobbin over said ring and expand freely in said fluid medium behind said vehicle, in which said vehicle is adapted to propel itself through water, said dispensing unit being positioned at said aft end of the housing to create a driving thrust through the hollow center of the bobbin, and including a propeller mounted to turn within said bobbin.

13. A remotely guided vehicle for traveling through a fluid medium, said vehicle comprising a housing having a forward end and an aft end, a propulsion engine mounted to said housing, a detector in said housing for detecting and creating signals representing objects adjacent to the path of travel of said vehicle, a fiber-optic cable storage and dispensing unit mounted to said housing, said storage and dispensing unit including a cylindrical bobbin, a mounting structure for mounting said bobbins to said housing, said bobbin having forward and aft ends, a raised dispensing guide ring secured at said aft end of said bobbin, a quantity of fiber-optic cable wound on said bobbin to a position located radially inwardly of said guide ring and connected to said detector at one end and to guidance control equipment at the opposite end, and a shroud around said bobbin and spaced from said ring so as to allow said cable to be pulled off of said bobbin over said ring and expand freely in said fluid medium behind said vehicle, in which said propulsion engine comprises a plurality of thrusters forming plumes forwardly of and directed away from said dispenser.

14. A remotely guided vehicle for traveling through a fluid medium, said vehicle comprising a housing having a forward end and an aft end, a propulsion engine mounted to said housing, a detector in said housing for detecting and creating signals representing objects adjacent to the path of travel of said vehicle, a fiber-optic cable storage and dispensing unit mounted to said housing, said storage and dispensing unit including a cylindrical bobbin, a mounting structure for mounting said bobbins to said housing, said bobbin having forward and aft ends, a raised dispensing guide ring secured at said aft end of said bobbin, a quantity of fiber-optic cable wound on said bobbin to a position located radially inwardly of said guide ring and connected to said detector at one end and to guidance control equipment at the opposite end, and a shroud around said bobbin and spaced from said ring so as to allow said cable to be pulled off of said bobbin over said ring and expand freely in said fluid medium behind said vehicle, in which said vehicle is adapted to propel itself through water, said dispensing unit being positioned at said aft end of the housing to create a driving thrust through the hollow center of the bobbin, in which said fluid medium is a liquid, and including a brake for selectively braking the flow of cable from said bobbin.

* * * * *